United States Patent [19]

Weaver

[11] Patent Number: 4,619,463
[45] Date of Patent: Oct. 28, 1986

[54] UNIVERSAL ADJUSTMENT HITCH

[76] Inventor: Robert C. Weaver, R.D. #1, Port Matilda, Pa. 16870

[21] Appl. No.: 756,383

[22] Filed: Jul. 18, 1985

[51] Int. Cl.⁴ .............................................. B60S 9/04
[52] U.S. Cl. ..................................... 280/475; 15/82; 280/479 A; 280/494; 280/763.1
[58] Field of Search .............. 280/490, 491 R, 491 A, 280/491 B, 491 D, 493, 494, 479 A, 475, 35, 763.1; 403/44, 45, 43; 15/82

[56] References Cited

U.S. PATENT DOCUMENTS

| | | | |
|---|---|---|---|
| 831,514 | 9/1906 | Johnston | 280/475 |
| 1,354,654 | 10/1920 | Johnston | 280/490 R |
| 2,259,632 | 10/1941 | Grace | 15/82 |
| 2,327,308 | 8/1943 | Johnston | 280/490 R |
| 2,388,923 | 11/1945 | Masters | 280/475 |
| 3,989,276 | 11/1976 | Hamerl | 280/763.1 |
| 4,108,472 | 8/1978 | Weir | 280/763.1 |
| 4,113,274 | 9/1978 | Vahrenkamp | 280/475 |
| 4,130,269 | 12/1978 | Schreyer | 403/45 |
| 4,131,295 | 12/1978 | Highberger | 280/475 |
| 4,136,909 | 1/1979 | Duttarer | 280/475 |

FOREIGN PATENT DOCUMENTS 154738  1/1954  Australia ................................. 15/82

Primary Examiner—John J. Love
Assistant Examiner—Everett G. Diederiks, Jr.
Attorney, Agent, or Firm—Thomas E. Sterling

[57] ABSTRACT

This invention is an adjustable height hitching device adapted to connect a towed vehicle to a towing vehicle. The invention consists of a tow bar pivoted upon an attaching element which is coupled to the towed vehicle. The end height of the tow bar can be varied by a turnbuckle movably coupled between the tow bar and the attaching element. The height of the coupling portion of the tow bar can be adjusted to the height of the coupling on the towing vehicle.

7 Claims, 10 Drawing Figures

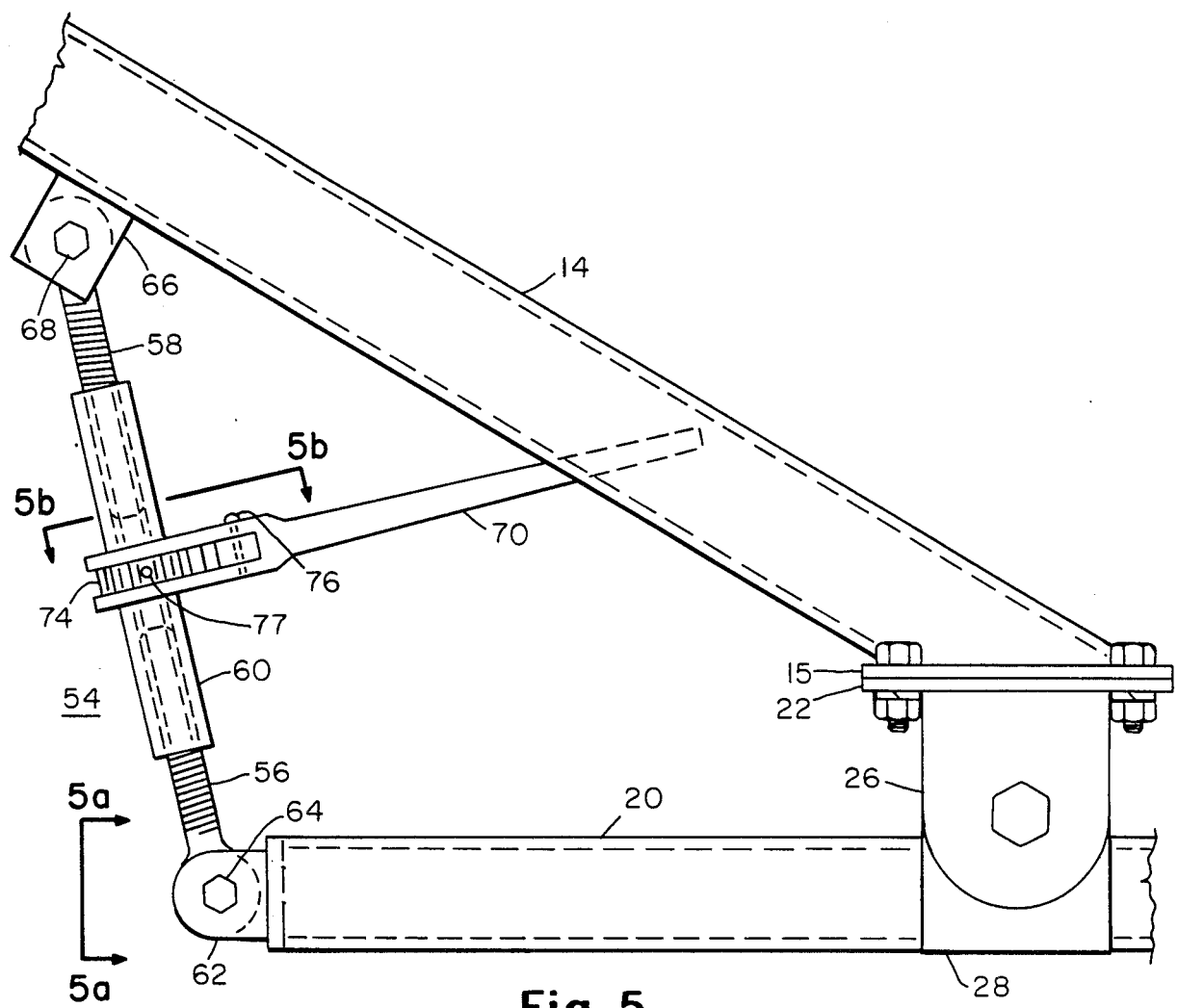
Fig. 5.
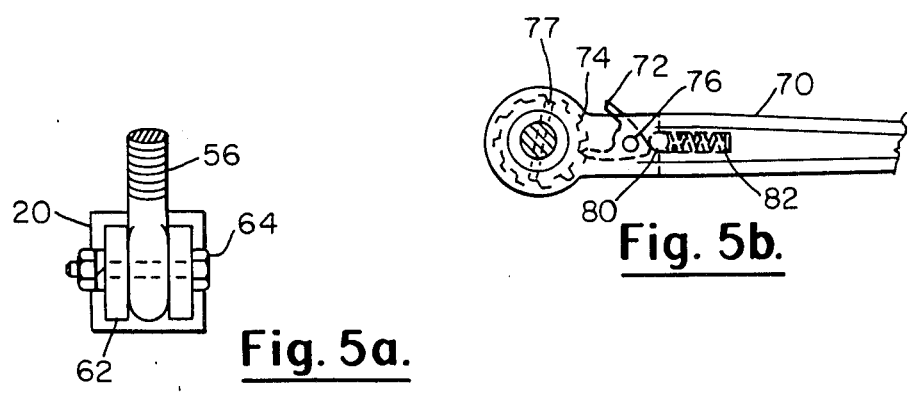
Fig. 5a.
Fig. 5b.

UNIVERSAL ADJUSTMENT HITCH

PRIOR ART STATEMENT

This invention relates to tow hitches, and in particular to hitches which attach a towed vehicle to a towing vehicle. More particularly this invention relates to a tow hitch towing a vehicle or piece of equipment which must be maintained at a precise height in a situation where the height of the hitch on the towing vehicle varies.

Specifically this invention was developed to replace the front wheel assembly of a three wheel power broom used for sweeping the streets and roads. The original power broom consisted of two rear wheels supporting the power plant and a forward front wheel behind which the rotating broom was located. The power broom is the type of equipment which must be maintained at a specific height above the road surface. The brush height when sweeping with these brooms is critical to allow proper sweeping action and brush wear. The three wheel assembly of the power broom is difficult to manipulate, particularly in backing up. The replacement of this front wheel of the three wheel assembly allows the broom to be backed up as easily as a two wheel trailer and does not require a screw type hitch jack. The present invention is simple and easy to adjust to any height of towing vehicle coupling. It can level the power broom to the correct working height in just a few seconds by turning a simple ratcheting type adjuster mechanism.

It is an object of this invention therefore to provide a hitch for a towed vehicle which can be caried in height to fit the coupling of a towing vehicle.

It is another object of this invention to replace the front wheel of a three wheel power broom assembly.

It is still another object of this invention to provide a hitch attachable to a towed vehicle which can be adjusted from 12 to 32 inches or more above the road surface.

It is yet another object of this invention to provide a tow bar attached to a towed vehicle which may be adjusted in height by the turning of a simple ratcheting type adjuster mechanism.

These and other objects of this invention are more specifically set forth in the following specification and claims having drawings in which:

FIG. 5, is a view taken along lines 5—5 of FIG. 1.

FIG. 5a, is a view taken along lines 5a–5a of FIG. 5.

FIG. 5b, is a view taken along lines 5b–5b of FIG. 5.

Figure 1:
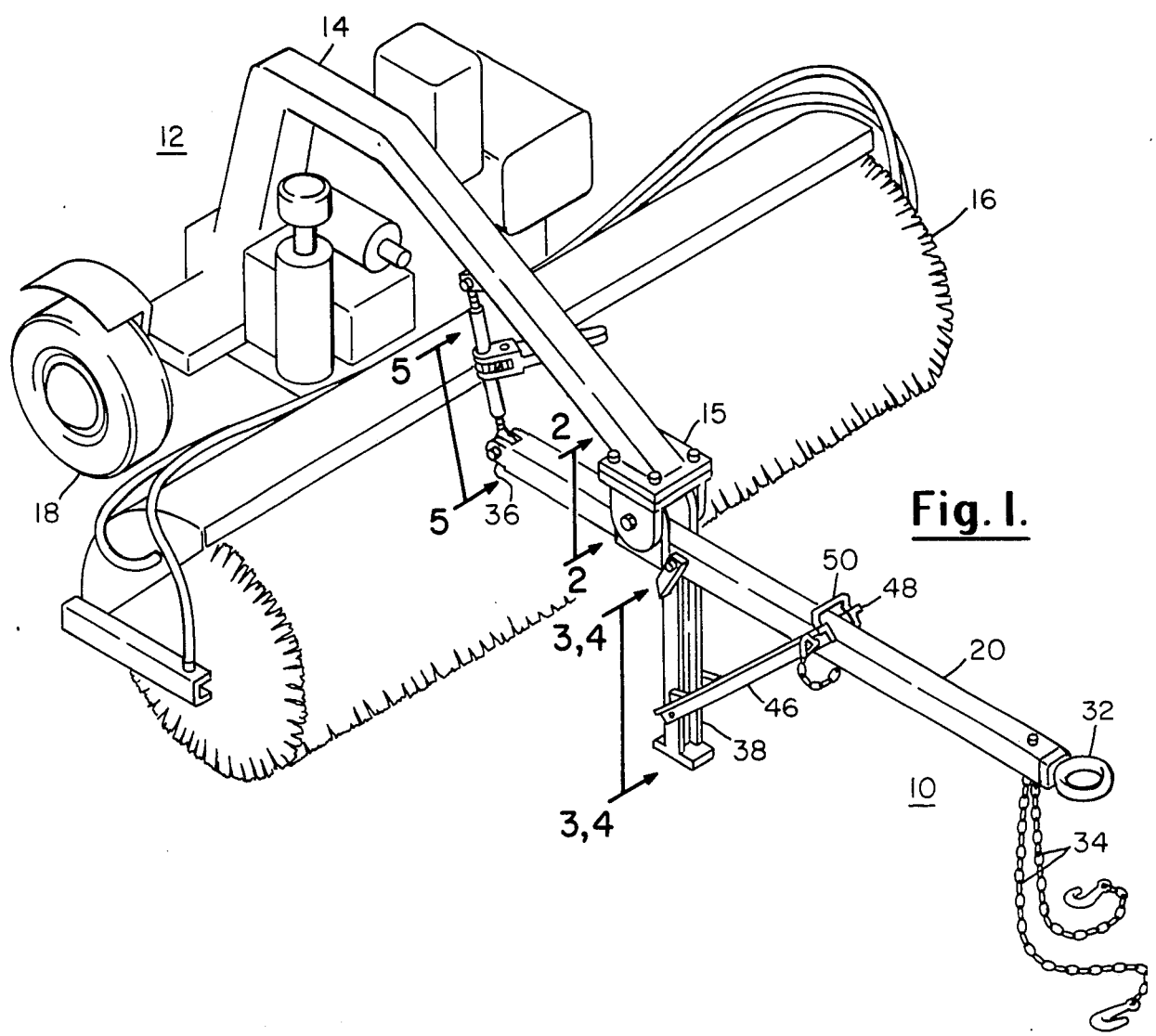
FIG. 1, is a three dimensional drawing of the present invention attached to a power broom which is used for sweeping streets and roads.
Figure 2:
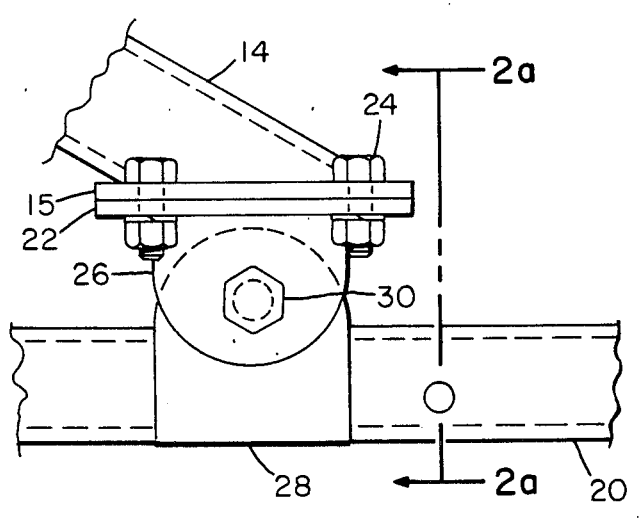
FIG. 2, is a view of the invention taken along lines 2a—2a of FIG. 2.
Figure 2A:
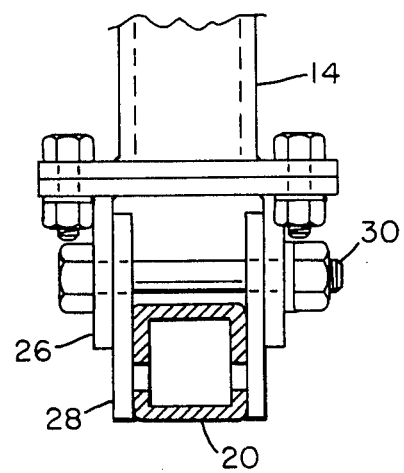
FIG. 2a, is a view of the invention taken along lines 2—2 of FIG. 1.

Referring now to the drawings and in particular to FIG. 1, 10 represents the universal adjustable hitch invention attached to a power broom or road sweeper 12. Arc shaped attaching element 14 is coupled to the bed of the power broom 12 and extends upward and forward thereof. The forward end portion of attaching element 14 is welded to a horizontal coupling plate 15. Rotatable brush 16 is drivably attached to the road sweeper 12 and may be rotated by the engine and controls (not shown) on the road sweeper 12. Rear road sweeper wheel 18 is rotatably coupled to the road sweeper 12 as is its companion wheel (not shown) allowing the road sweeper 12 to be rolled along a flat surface.

A coupling plate 22 is bolted to attaching element coupling plate 15 by means of plate bolts 24. Coupling plate 22 is welded to two pivoting elements 26 which extend perpendicularly to it and parallel to each other. A two bar 20 is pivotally attached to pivot element 26 by means of two tow bar pivot elements 28 welded to tow bar 20 and positioned within pivot elements 26, a pivot bolt 30 extending therethrough. Pivot bolt 30 therefore acts as a fulcrum about which tow bar 20 rotates.

The forward end portion of two bar 20 has a towing ring 32 attached which is coupled to the towing vehicle (not shown) in order to tow the assembly. The rear end portion of tow bar 20 is attached to a U-shaped extension element 62 having a bolt 64 therethrough.

Figure 3:
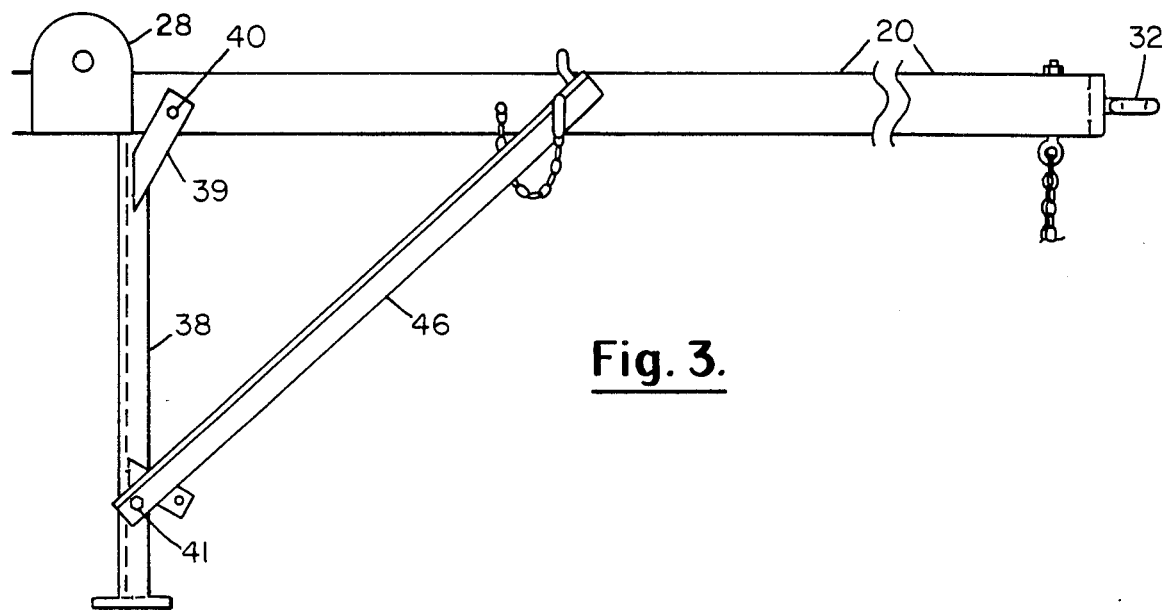
FIG. 3, is a side view of the invention taken along lines 3—3 of FIG. 1.

FIGS. 1 and 3 show the tow bar 20 supported by a stand 38 extending perpendicularly thereto. Two pivot protrusions 39 attached to stand 38 extend on either side of two bar 20 and are attached thereto by means of a pivot bolt 40 which extends through the pivot protrusions and tow bar 20 allowing stand 38 to pivot about pivot bolt 40. A stand support 46 is pivotally attached to at 41 and extends upon either side of tow bar 20 which it is attached by a support pin 48 passing through the two legs of support stand 46 and tow bar 20. A cotter pin 52 extends through the end portion of support pin 48 preventing it from being withdrawn from the assembly. A U-shaped element 50 attached to the end portion of stand support 46 extends over the top portion of tow bar 20 maintaining the upper portion of stand 46 in constant contact with tow bar 20.

Figure 4A:
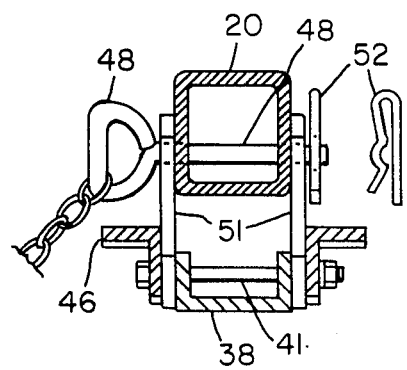
FIG. 4a, is a view taken along lines 4a–4a of FIG. 4.
Figure 4:
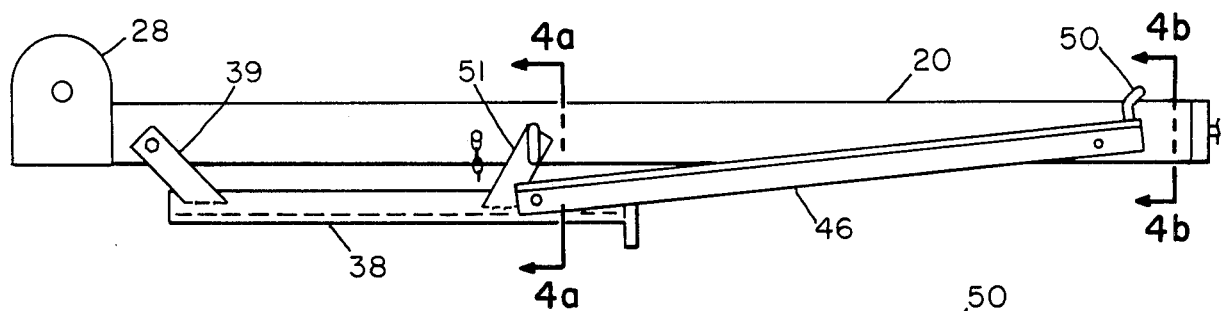
FIG. 4, is a side view of the invention with the supporting stand in its stored or collapsed position.
Figure 4B:
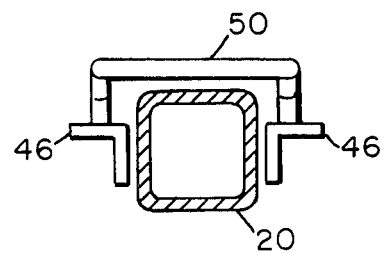
FIG. 4b, is a view taken along lines 4b–4b of FIG. 4.

By removing cotter pin 52 from support pin 48, the support pin 48 may be removed from stand support 47 and withdrawn. U-shaped element 50 may then be pulled along the axis of two bar 20, allowing stand 38 to pivot about pivot bolt 40 and stand support 46 to pivot to draw stand 38 against tow bar 20 as may be seen in FIG. 4. Two retaining ears 51 attached to stand 38 are thus positioned on either side of two bar 20 and may be retained there by inserting support pin 48 through the retaining ears 51 and tow bar 20, thus securing the assembly in the closed position.

The height of towing ring 32 may be adjusted by means of a turnbuckle 54, FIG. 5, positioned between extension element 62 on the inner end of tow bar 20 and two protrusions 66 attached to attaching element 14. Turnbuckle 54 is comprised of two threaded elements 56 and 58 pivotally attached respectively to extension element 62 by means of bolt 64 and protrusion 66 through which passes pivot bolt 68. Threaded elements 56 and 58 may thus pivot about their respective bolts. Internally threaded central element 60 is screwed into threaded elements 56 and 58. The threads on elements 56 and 58 are such that the turning of central element 60 in a clockwise direction will cause threaded elements 56 and 58 to move outwardly from central element 60. The turning of central element 60 in a counter clockwise direction will cause threaded elements 56 and 58 to contract within central element 60, thus drawing extension element 62 upwardly and lowering towing ring 32.

The central portion of central element 60 has a ring of ratchet teeth 74 circumferentially positioned thereon. A ratchet handle 70 is positioned circumferentially about the ratchet teeth 74. A retaining pin 77 extends through the end portion of ratchet handle 70 and central element 60 attaching these elements together. A rotatable cog 72 is attached to ratchet handle 70 by means of pin 76. Pin 76 extends through ratchet handle 70 and cog 72. Cog 72 will rotate and preferentially engage the ratchet teeth 74, allowing the central element 60 to be turned in one direction. When cog 72 is rotated, central element 60 will be turned in the other direction. A ball 80 is biased by a compressed spring 82 contained within ratchet handle 70 and bears against the end portion of cog 72. Cog 72 is thus held rigidly in either the right turning or left turning position until it is manually moved. As may be seen, turnbuckle 54 may be thus turned to raise or lower the height of the towing ring 32 by pivoting tow bar 20 about pivot bolt 30.

The towing ring 32 may be thus raised or lowered to the height of the hitch on the towing vehicle (not shown) and engaged thereto. Towing ring 32 may be adjusted to the height of any towing vehicle hitch (not shown) within the adjusting scope of the device. The present device is designed to raise towing element 32 from 12 to 32 inches above the road surface. It is understood however that the design may be easily changed to increase its range of adjustability.

The usefulness of this invention thus becomes apparent. The height of the tow bar 20 and towing ring 32 is thus adjustable. The use of the third wheel on the conventional road sweeper has thus been eliminated and replaced by a simpler and more efficient and more maneuverable hitching device.

I claim:

1. On a towed power broom, said power broom having a wheel supported rear element and an attaching element coupled to and supported by said wheel supported rear element; an adjustable hitching device, comprising in combination:

pivoting means connected to said attaching element;
   a tow bar connected to said pivoting means;
   an adjusting device pivotally connected between said tow bar and said attaching element;
   a foldable supporting device pivotally connected to said tow bar, adapted to support said tow bar in an approximate horizontal position; said supporting device comprising in combination:
   a stand member pivotally attached to said tow bar and extending to ground support;
   a stand support member pivotally attached to said stand member;
   a hand grip attached to said stand support member and in sliding contact with said tow bar;
   removable locking device, movable between a support locking position in which said locking device secures said stand support member to said tow bar and stowed locking position in which said locking device secures said supporting device in a folded inoperative position.

2. The combination as claimed in claim 1, in which said stand support member has a hole therethrough, and said tow bar has a hole therethrough; said locking device comprising in combination:

a removable lock pin extends through said hole in said stand support member and said hole in said tow bar when said locking device is in said support locking position,
   whereby said supporting device is secured in a support position.

3. The combination as claimed in claim 2, in which said stand member has flange means on a lower portion thereof, said flange means having an axially aligned hole therethrough, and wherein said removable pin extends through said hole in said flange means and said hole in said tow bar when said locking device is in said stowed locking position;
   whereby said supporting device is secured in a folded position.

4. The combination as claimed in claim 2, in which said lock pin has a hole therethrough;
   a removable cotter pin extending through said hole and said lock pin locking said lock pin in position.

5. The combination as claimed in claim 4, in which said stand support member is comprised of two segments extending on either side of said tow bar.

6. The combination as claimed in claim 5, in which said adjusting device is comprised of a turnbuckle device, said turnbuckle device comprising of in combination:

a threaded element pivotally attached to said attaching element;
   a tow bar threaded element pivotally attached to said tow bar;
   an internally threaded central element connecting said threaded element, said attaching threaded element and said tow bar threaded element in threaded relationship;
   a ratchet circumferentially positioned about said central element;
   a ratchet handle extending around said ratchet device;
   a spring loaded two pronged directional dog pivotally attached to said ratchet adapted to engage said ratchet in a directional selective relationship.

7. The combination as claimed in claim 6, in which said pivoting means is comprised of in combination:

a substantially horizontal attaching plate coupled to an attaching element;
   a substantially horizontal coupling plate, bolt attached to said attaching plate on its horizontal surface;
   an attaching pivot element integrally attached to said coupling plate;
   a tow bar pivot element adjacent to said attaching pivot element and integrally attached to said tow bar;
   a pivot pin extending through said attaching pivot element and through said tow bar pivot element.

* * * * *